United States Patent [19]
Paulsen et al.

[11] Patent Number: 5,948,539
[45] Date of Patent: Sep. 7, 1999

[54] MEDICAL ELECTRICAL LEAD AND REINFORCED SILICONE ELASTOMER COMPOSITIONS USED THEREIN

[75] Inventors: Mark J. Paulsen, Santa Barbara, Calif.; Jennifer P. Miller, Elk River; Michael J. Ebert, Fridley, both of Minn.

[73] Assignee: Medtronic, Inc., Minneapolis, Minn.

[21] Appl. No.: 08/697,991

[22] Filed: Sep. 4, 1996

[51] Int. Cl.⁶ ........................................ B32B 9/04
[52] U.S. Cl. .......................... 428/447; 428/450; 523/212; 524/862
[58] Field of Search ............................ 523/212; 524/862; 428/447, 450

[56] References Cited

U.S. PATENT DOCUMENTS

| | | | |
|---|---|---|---|
| 3,284,406 | 11/1966 | Nelson | 260/46.5 |
| 3,341,490 | 9/1967 | Burdick et al. | 260/37 |
| 3,457,214 | 7/1969 | Modic . | |
| 3,996,187 | 12/1976 | Travlnicek | 260/37 SB |
| 3,996,189 | 12/1976 | Travnicek | 260/37 SB |
| 4,309,557 | 1/1982 | Compton et al. | 556/453 |
| 4,455,691 | 6/1984 | VanAken et al. . | |
| 4,472,226 | 9/1984 | Redinger et al. . | |
| 4,615,702 | 10/1986 | Koziol et al. . | |
| 5,236,970 | 8/1993 | Christ et al. . | |

FOREIGN PATENT DOCUMENTS

| | | |
|---|---|---|
| 0110537 | 6/1984 | European Pat. Off. . |
| 0579132 | 1/1994 | European Pat. Off. . |

OTHER PUBLICATIONS

Kazemi–Shirazi H et al: "New Silicone Rubbers, 2 Biocompatible Silicone Rubbers", Angewandte Makromolekulare Chemie, vol. 205, Feb. 1, 1993, pp. 193–201, XP000345380.

Primary Examiner—Melvyn I. Marquis
Attorney, Agent, or Firm—Reed A. Duthler; Harold R. Patton

[57] ABSTRACT

A medical electrical lead and a reinforced silicone elastomer used therein. The silicone elastomer used therein is preferably made from a novel silica reinforced polysiloxane material, which after vulcanization by cross-linking exhibits improved mechanical properties. The medical electrical lead features a an electrode at a distal end thereof, a connector at a proximal end thereof and an elongated electrical conductor extending between the electrode and the connector, the conductor in electrical contact with the electrode at a distal end and in electrical contact with the connector at a proximal end, the conductor comprised of a plurality of wires or wire bundles wound in a multifilar coil configuration.

6 Claims, 2 Drawing Sheets

MEDICAL ELECTRICAL LEAD AND REINFORCED SILICONE ELASTOMER COMPOSITIONS USED THEREIN

BACKGROUND OF THE INVENTION

1. Field of the Invention

The present invention is directed to reinforced polysiloxane elastomer compositions of improved mechanical properties. More specifically the present invention is directed to reinforced polysiloxane elastomer compositions which have improved creep resistance, improved compression set and improved crush resistance and are eminently suitable for use as insulators for leads of implantable medical devices, particularly cardiac pacemakers.

2. Brief Description of the Prior Art

Polysiloxane elastomer compositions have been known in the art for a long time. Many polysiloxane elastomer compositions of the prior art contain a silica reinforcer that has been treated to make it compatible with the generally hydrophobic polysiloxane matrix of the elastomer. Prior art pertaining to polysiloxane materials can be found in U.S. Pat. Nos. 3,341,490, 3,284,406, 3,457,214, 3,996,187, 3,996,189, 4,615,702, 5,236,970 and in European Patent application No. 0110537 filed on Oct. 18, 1983.

Silicone elastomer rubber tubing that contains silica reinforcing material has been extensively used as insulator on electrical leads, particularly on leads of implantable medical devices, perhaps most importantly from the standpoint of the present invention, on leads of cardiac pacemakers. An early version of the reinforced elastomer used as insulators on implantable devices, primarily pacemakers, was known in the trade as Dow Corning MDX4-4516. A later version was known as Dow Corning HP (high performance) material. The early version (MDX4-4516) consisted of silica reinforced polydimethylsiloxane which included approximately 0.142 mol per cent methylvinylsiloxane [$(CH_3)(CH_2=CH)Si—O$] units. The end blocking (terminal) units of this early version of the polymer were dimethylvinylsiloxane units [$(CH_3)_2(CH_2=CH)Si—O$]. Based on the presence of approximately 0.142 mol percent of methylvinylsiloxane units in this prior art polymer, it can be calculated that approximately 750 dimethylsiloxane [$(CH_3)_2SiO$] units are disposed on the average between each "pendant" vinyl group in the polysiloxane chain. The vinyl groups in the polymer participate in a cross-linking reaction which occurs in the final curing step when the polymer is formed into a desired shape, such as a single or multi-lumen tubular object. The curing or cross-linking step was initiated by addition of a peroxide catalyst or catalysts. The filler material of this earlier version was silica that had been treated with dimethylsiloxane oligomer.

The later, high performance version of the prior art silicone elastomer (Dow Corning HP) used as leads in implantable medical devices, primarily pacemakers, consisted of a blend of a first (major) and a second (minor) polysiloxane composition. The first and major composition comprised approximately 80–90 per cent (by weight) of the blend, and this composition contained no pendant vinyl or other pendant olefinic groups. The second and minor composition comprised the balance of the blend (before reinforcing treated silica was added), and had approximately 2 mol percent methylvinylsiloxane [$(CH_3)(CH_2=CH)Si—O$] units and was also terminated with dimethylvinylsiloxane [$(CH_3)_2(CH_2=CH)Si—O$] units. The reinforcing material was silica that had been treated with a reagent that introduced trimethylsilyl groups into the material, thereby replacing OH functions with $OSi(CH_3)_3$ functions and rendering the treated silica compatible with the "hydrophobic" silicone polymer. The curing or cross-linking step was initiated by addition of a platinum catalyst or catalysts.

As it will be readily appreciated by those skilled in the art, certain mechanical properties, such as tear strength, abrasion resistance, resistance to shredding, compression set, crush and creep resistance are of great importance in the materials for electrical leads in any device that is implanted into the human body, and particularly so for insulators of cardiac pacemakers. It should also be readily appreciated by those skilled in the art that improved mechanical properties, and particularly improved compression set, creep and crush resistance allow the manufacture of insulated electrical leads of smaller dimensions and therefore facilitates "downsizing" of the implantable device. Whereas the later version (Dow Corning HP) of the above-summarized prior art silicone elastomers had certain improved mechanical properties (for example improved tear strength) relative to the earlier MDX4-4516 version, it was then surprising to the artisans in the field that this otherwise improved material had less crush resistance than the earlier MDX4-4516 material. Therefore, up to the present invention the prior art struggled with the problem that neither of the two types of silicone elastomeric materials available for forming insulators for cardiac pacemaker and similar implantable leads had optimal characteristics. As noted above, the earlier version could have used improvement in several mechanical properties, and the later version had improved mechanical properties in virtually all aspects, but had less crush resistance than the earlier version.

In light of the foregoing, up to the present invention the need still existed in the prior art for a polysiloxane elastomer material which is suitable for use as insulator for leads of implantable electrical devices, particularly cardiac pacemakers, and which has improved overall mechanical properties, including improved compression set, and improved crush and creep resistance. The present invention provides such a material.

SUMMARY OF THE INVENTION

It is an object of the present invention to provide a silicone elastomer material which is suitable for forming insulation for electrical leads of implantable medical devices, and which has improved overall mechanical properties.

It is another object of the present invention to provide insulating single-lumen or multi-lumen tubular material for electrical leads of implantable medical devices, especially cardiac pacemakers, which material has improved overall mechanical properties, including improved compression set, and improved crush resistance.

The foregoing and other objects of the present invention are attained by an elastomer composition that, before a cross-linking step of final curing, essentially consists of the following materials:

approximately 23 to 45 percent by weight of silica that had been silyliated by treatment;

the balance of the composition being a polysiloxane copolymer composed of divalent —$R_1R_2SiO$—, divalent —$R_3R_4SiO$— and monovalent (terminal, or end-blocking) $R_5R_6R_7SiO$— units, where $R_1$ and $R_2$ independantly are lower alkyl of 1 to 6 carbons, phenyl or trifluoropropyl, $R_3$ is vinyl, allyl, or other olefinic group having up to 4 carbons, $R_4$ is lower alkyl of 1 to 6 carbons, phenyl or trifluoropropyl, and $R_5$, $R_6$, and $R_7$ independantly are lower alkyl of 1 to 6 carbons, phenyl, vinyl, allyl, or other olefinic group having up to 4 carbons.

The above-described polysiloxane copolymer has a degree of polymerization (D.P.) approximately in the range of 3500 to 6500, and the olefin containing —$R_3R_4$SiO— groups are randomly distributed in the copolymer and are present approximately in the 0.05 to 0.3 mol percent range. The balance of the polysiloxane copolymer composition is made up of the above noted divalent —$R_1R_2$SiO— siloxane units, and of the end-blocking $R_5R_6R_7$SiO— units. However, to the extent $R_1$, or $R_2$, or both may represent phenyl groups, the proportion of the phenyl-containing divalent siloxane units does not exceed 15 mol per cent. To the extent $R_1$ or $R_2$ represents trifluoropropyl groups, the proportion of the trifluoropropyl-containing divalent siloxane units does not exceed approximately 40 mol per cent in the polysiloxane copolymer of the invention. In such situations in the balance of the —$R_1R_2$SiO— siloxane units the substituents are neither phenyl, nor trifluoropropyl substituted, respectively.

Those skilled in the art will readily understand that the proportion of the end-blocking $R_5R_6R_7$SiO— units, as expressed in mol percentage, is determined by the degree of polymerization: when the degree of polymerization is 5000, the end blocking groups are present as 2/5000 mol per cent.

The above-described composition undergoes a cross-linking or "final curing" step after a platinum catalyst, an organohydrogen polysiloxane cross-linker and a suitable inhibitor are added. The composition that exhibits the desired improved mechanical/physical properties is a result of the cross-linking or final curing reaction. In the cured composition covalently linked intermolecular and intramolecular ethylenic (—$CH_2$—$CH_2$—) bridges are formed from some of the olefin groups of the polysiloxane copolymer. The improved mechanical/physical properties include high tear, abrasion creep and crush resistance, and improved compression set. The cured silicone material is resistant to crack initiation under compressive loading. The objects consisting of the composition of the present invention, such as the single or multi-lumen tubes that are used as insulators for leads of cardiac pacemakers (or of other implantable medical devices) can be formed by means known in the art, such as extrusion or molding. The final curing step occurs when the composition has already been formed into substantially the desired shape.

The features of the present invention can be best understood together with further objects and advantages by reference to the following description, taken in connection with the accompanying drawing.

The drawings are not necessarily to scale.

DETAILED DESCRIPTION OF THE INVENTION

Reinforced elastomeric compositions are provided in accordance with the present invention which after curing by cross-linking are suitable for use as insulators for electrical leads, and particularly as insulators for medical electrical leads, especially cardiac pacemaker leads.

In a preferred embodiment of the present invention, a medical electrical lead which features a reinforced elastomeric composition comprises an electrode at a distal end thereof, a connector at a proximal end thereof and an elongated electrical conductor extending between the electrode and the connector, the conductor in electrical contact with the electrode at a distal end and in electrical contact with the connector at a proximal end, the conductor comprised of a plurality of wires or wire bundles wound in a multifilar coil configuration.

Figure 1:
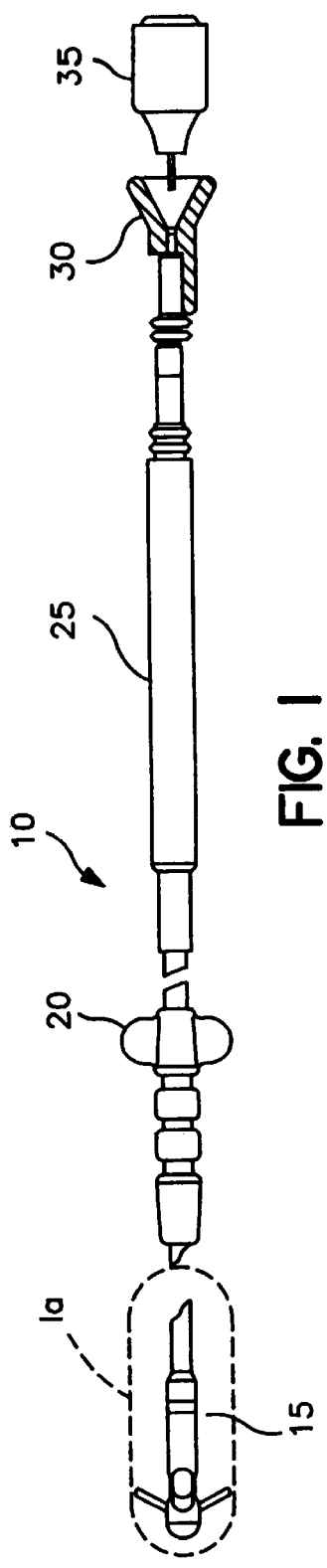
FIG. 1 is a plan view of a medical electrical lead system suitable for endocardial stimulation by an implantable heart pacemaker.

Referring now to the drawings, FIG. 1 shows a lead system 10 which includes a lead assembly 15, an anchoring sleeve 20, a connector 25, a stylet guide 30, and a stiffening stylet 35. As is well known in the art, once implanted stylet guide 30, and a stiffening stylet 35 are removed from lead.

Figure 1A:
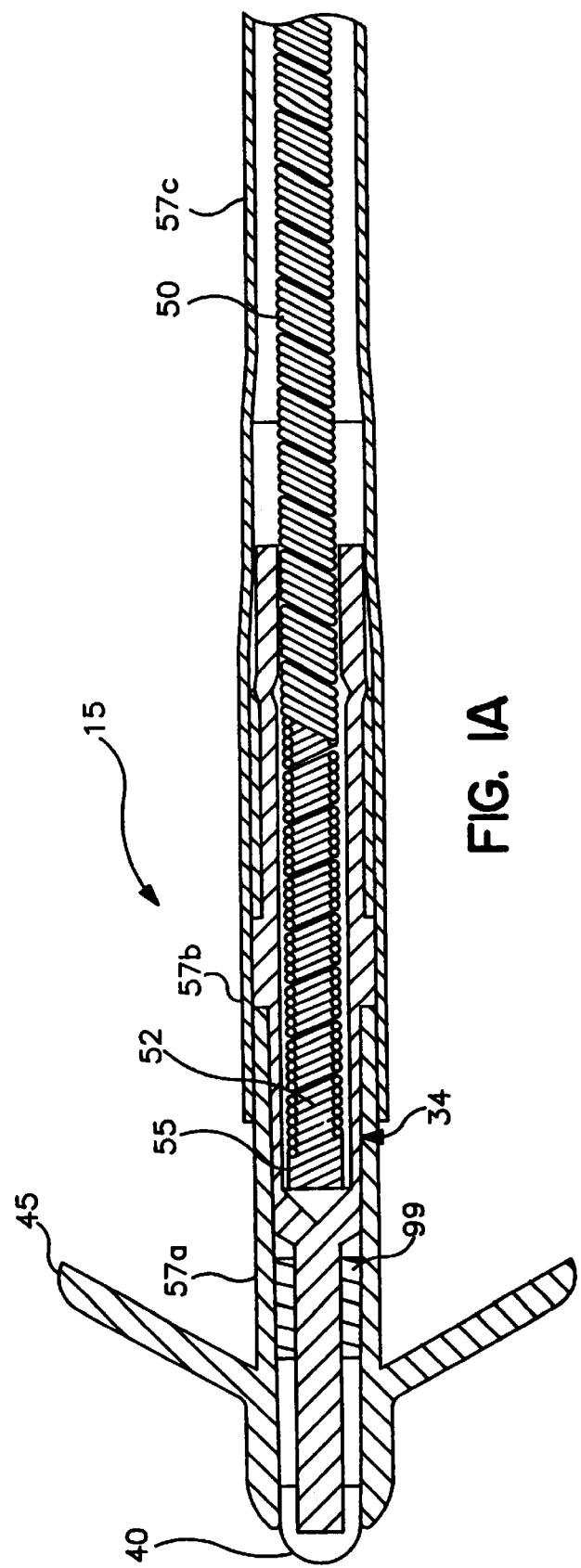
FIG. 1a is a cross-sectional view of a lead assembly portion of the lead system of FIG. 1.

Referring now to FIG. 1a, the lead assembly 15 is shown in greater detail with an electrode structure 40 at a distal end of the lead assembly 15, a tine 45 to secure the lead assembly 15 to the endocardium, a lead conductor 50 in a multifilar coil configuration which allows the stiffening stylet 35 to be inserted into the lead assembly 15 in the internal lumen 52 of the lead conductor 50. The lead conductor 50 is shown attached at its distal end 55 to the electrode structure 40. The lead conductor 50 is also similarly attached at a proximal end (not shown) to the connector 25. In the preferred embodiment conductor 50 is a multifilar coil. Insulation elements 57a, 57b and 57c insulate portions of the electrode structure 40 and the lead conductor 50. Such insulation elements 57a, 57b, and 57c are preferably made from any of the reinforced polysiloxane elastomer compositions already described above. The insulator 57c is typically a hollow polymeric tube extending between the proximal and distal ends of the lead assembly 15 and insulating the lead conductor 50 from surrounding body tissues. Housed within insulator at the distal end is a monolithic controlled device 99 to elute an anti-inflammatory agent, as is well known in the art. While a unipolar lead is shown, and described above, the present invention can also be applied to bipolar leads in the same manner. As used in implantable pacing leads, the individual wires of the lead conductor 50 would be typically about 0.004 to 0.010 in diameter and would be wound into extremely small coils; typically having a diameter of less than 23 turn.

Turning now to the elastomeric composition of the present invention, before final curing or cross-linking, includes a polysiloxane copolymer that has the following composition and characteristics. The polysiloxane copolymer has a degree of polymerization of approximately 3500 to 6500, with a D. P of approximately 5000 being preferred. Those skilled in the art will readily understand that the actual extent or degree of polymerization of a polysiloxane product is very difficult, if not impossible, to measure. Therefore, the "degree of polymerization" normally used in the art to characterize a polysiloxane product is usually based on theoretical considerations and measurements which measure a physical characteristic (such as plasticity) that is related to D.P. Therefore, in accordance with usual practice in the art the designated degree of polymerization of a polysiloxane material is that which would be normally expected based on the materials and conditions used in the polymerization reaction and on measurements of certain characteristics, such as plasticity.

The polysiloxane copolymer includes divalent —$R_1R_2$SiO— and divalent $R_3R_4$SiO— units where the $R_1$ and $R_2$ groups independantly are lower alkyl of 1 to 6 carbons, phenyl or trifluoropropyl. Preferably, the $R_1$ and $R_2$ groups both are methyl. Therefore in the preferred embodiment of the composition of the invention the —$R_1R_2SiO$— unit represents dimethylsiloxane [$(CH_3)_2SiO$].

$R_3$ is vinyl, allyl, or other olefinic group having up to 4 carbons, and $R_4$ is lower alkyl of 1 to 6 carbons, phenyl or trifluoropropyl. Preferably the $R_3$ group is vinyl and the $R_4$ group is methyl. Therefore in the preferred embodiment of the composition of the invention the —$R_3R_4SiO$— groups represents methylvinylsiloxane [$CH_3(CH_2=CH)SiO$]. The presence of the vinyl (or other olefinic group designated $R_3$) is important for the present invention because these "pendant" vinyl (all other olefinic) groups enable the cross-linking reaction which occurs during final curing, and which is described later. The —$R_3R_4SiO$— groups, or more preferably the methylvinylsiloxane groups, are present in the range of approximately 0.05 to 0.3 mol percent, preferably approximately 0.142 mol per cent. Except for the end-blocking groups described below, the balance of the polysiloxane copolymer consists of the —$R_1R_2SiO$—, preferably dimethylsiloxane, groups which thus form the backbone or bulk of the polysiloxane chain.

The nature of the end-blocking or terminal groups $R_5R_6R_7SiO$— is less critical from the standpoint of the present invention than in the prior art. The $R_5$, $R_6$, and $R_7$ groups independantly are lower alkyl of 1 to 6 carbons, phenyl, vinyl, allyl, or other olefinic group having up to 4 carbons. It is noteworthy, that unlike in the prior art the end-blocking group does not need to necessarily include a vinyl or other olefinic group, although in the preferred embodiment the end blocking group is dimethylvinylsiloxane [$(CH_3)_2(CH=CH_2)SiO$]. The proportion (expressed in mol percent) of the endblocking groups relative to the entire polysiloxane copolymer is determined by the degree of polymerization of the substance. With a preferred D.P. of 5000, the mol percent of the end blocking groups is 2/5000. Because the range of D.P. of the polysiloxane copolymer is approximately 3500 to 6500 in accordance with the invention, the mol percentage of the end blocking groups is in the range of approximately 2/6500 to 2/3500 (approximately 0.00031 to 0.0006 mol percent).

It follows from the foregoing data that the mol percentage of the —$R_1R_2SiO$—, preferably dimethylsiloxane, groups in accordance with the invention groups (calculated to two decimal points) is in the range of approximately 99.7 to 99.95 mol percent. However when the $R_1$ or $R_2$ symbols, or both, represent phenyl groups then the proportion of the phenyl-containing divalent siloxane units does not exceed 15 mol per cent, the balance of the —$R_1R_2SiO$— groups do not include a phenyl group. A similar restriction of approximately 40 mol per cent applies when the $R_1R_2SiO$— group includes trifluoropropyl.

The above described composition of the polysiloxane copolymer is novel and surprising especially in terms of the mechanical properties achieved. This is because, as is noted in the description of the prior art, the prior art MDX4-4516 copolymer having "pendant" vinyl groups lacked somewhat in mechanical properties such as tear resistance. The other prior art HP product which had pendant vinyl groups only in a minor component of two blended copolymers, had improved tear resistance but decreased crush resistance. Therefore, it is surprising that the present composition that includes pendant vinyl groups in the single and therefore major macromolecular component of the elastomer, has increased compression set, and improved creep, crush and abrasion resistance.

Another major component of the elastomeric composition of the present invention is silyliated silica that acts as a reinforcer in the composition. Blending silyliated "fumed silica" into a polysiloxane copolymer as a "reinforcer" and to improve its mechanical properties, per se is not new in the art. In accordance with the present invention the fume silica used as a reinforcer is treated with a reagent that introduces trialkylsilyl groups (alkyl has 1 to 6 carbons, preferably 1 to 2) to the surface of the silica so that a plurality of OH functions on the surface become O(trialkylsilyl) functions. Preferably, trimethylsilyl groups are introduced into the silica used in the composition of the present invention. The silica used in the present invention has a relatively small surface area, as this term is understood in the art, nevertheless the surface area should be at least approximately 200 meter$^2$/gram of the yet not silyliated silica. The silyliation, preferably introduction of trimethylsilyl groups, can be accomplished before the silica is admixed or blended with the polysiloxane copolymer that has been described above. Alternatively, the silyliation of the silica may be performed as part of the blending process of the copolymer with the silica. In the preparation of the preferred embodiment of the elastomer of the present invention the latter procedure is preferred. In any event, the degree of silyliation is normally measured in the art by expressing the carbon content of the silyliated silica. (As is known, the carbon content can be readily determined analytically, for example by combustion analysis.) In accordance with the present invention the carbon content of the trimethyl silyl groups containing silica should be in the range of approximately 4 to 8 per cent by weight of the silyliated silica, and preferably approximately 7.3 per cent by weight. The amount of treated (trimethylsilyliated) silica used in the composition is in the range of approximately 23 to 45 per cent by weight of the composition, with approximately 39 per cent by weight being preferred.

The elastomeric composition which is the result of blending treated silica and the above-described polysiloxane copolymer together is not cross linked (not yet cured or vulcanized) and therefore does not yet have the desired physical/mechanical properties. Nevertheless this blend or composition (sometimes referred to as the "base") itself is considered innovative and useful because it serves as a precursor to the cured elastomer that has the advantageous mechanical properties. Thus the uncured composition or base has the inherent characteristics of providing, after suitable vulcanization by cross-linking, a material that can be shaped to form tubular insulators for pacemaker leads, having excellent mechanical properties.

Normally the final curing and vulcanization step is performed only after the blend or composition is shaped into the desired object (for example by extrusion or molding) and this step of fabrication and vulcanization is normally performed at locations different than where the manufacture of the blend occurs. For these reasons, in accordance with standard practice in the art, the blend composition or base is divided into two substantially equal weight and volume aliquots, designated "Part A" and "Part B". Suitable catalyst to catalyze the cross-linking reaction is added to one of the aliquots (Part A), and a cross-linking agent and a cross-linking inhibitor is added to Part B. The two parts are kept and transported separately and are intimately mixed together just prior to fabrication of the desired object. The amounts of catalyst, cross-linking agent and inhibitor are "fine tuned" in the preferred embodiment of the present invention to provide appropriate time for the fabrication of insulators for cardiac pacemaker leads and similar objects.

As is known in the art, the cross-linking (curing or vulcanization step) is the result of a platinum catalyzed reaction between a silicon bonded "pendant" and/or terminal vinyl (or other olefinic group) and a silicon bonded hydrogen group. The vinyl (or other olefinic) group is present in the polysiloxane composition even before it is divided into Parts A and Parts B. The silicon bonded hydrogen group is present in the blend of the two parts because it is added to Part B in the form of a cross-linking agent. In the actual cross-linking reaction ethylenic (—$CH_2$—$CH_2$—) bridges are formed by saturating vinyl groups and linking one polymer molecule to a silicon atom of a cross-linking molecule, which is in turn linked by yet another ethylenic bridge (by saturating another vinyl group) to another polymer molecule. In essence the chemical reaction, which is per se known in the art, involves saturation of a vinyl (or other unsaturated) group of an $R_3R_4SiO$ unit and/or of a terminal $R_5R_6R_7SiO$ unit with the hydrogen derived from an at least difunctional organohydrogen polysiloxane, and formation of carbon to silicon bonds and thereby bridges between the several polysiloxane molecules.

More specifically, the platinum catalyst can be selected, within the skill of the art, primarily from organo platinum compounds, for example in accordance with U.S. Pat. Nos. 2,823,218 and 3,159,601 which are incorporated herein by reference. The platinum catalyst is added to Part A in amounts of approximately 6 to 30 parts per million as platinum, with the result that in the blend of Part A and Part B which is to be vulcanized or cured the platinum is present in the proportion of approximately 3 to 15 part per million per weight.

Although, as noted above the platinum catalyst can be selected within the skill of the art, in the preferred embodiment a platinum catalyst is used which is the result of complexing tetramethyidivinyidisiloxane with hexachloroplatinic acid pentahydrate, and this complex is added to Part A in the proportion of 10 to 24 part per million (ppm) per weight as platinum, preferably 20 ppm. A number of cross-linking agents are suitable for the practice of the present invention and can be selected by those familiar with the art. U.S. Pat. No. 3,436,366 describes a number of cross-linking agents and its specification is expressly incorporated herein by reference. Thus, the liquid organohydrogen polysiloxane cross-linkers shown in Column 2 of the above noted U.S. Pat. No. 3,436,366 and having the formula $(R)_a(H)_bSiO_{2-a/2-b/2}$ where R is simple lower alkyl and "a" ranges from 1.00 to 3, and "b" ranges from 0.1 to 1.0 are particularly satisfactory for use in the present invention. Especially suitable is the cross-linker of Column 4, lines 3–14 of the '366 patent which has the formula $R_2HSiO_{1/2}$ where the R groups are primarily or predominantly methyl. The cross-linking agent is added to the second aliquot (Part B) of the composition in the proportion of approximately 2 to 6 parts per hundred per weight of Part B. Consequently in the blend of Part A and Part B which is to be vulcanized or cured the cross-linking agent is present in the ratio of approximately 1 to 3 parts per hundred per weight.

It is important in accordance with the present invention that, after mixing the aliquots (Parts A and B) the cross-linking reaction not proceed too rapidly at room temperature, allowing at least a few hours and even up to 6–8 hours for work time with the mixed aliquots. For this reason one or more suitable inhibitors of the cross-linking reaction are also added to the mixture. Preferably the inhibitor is added to the Part B aliquot. Suitable inhibitors may be readily selected within the skill of the art. One example of such an inhibitor is 1,2,3,4-tetramethyl-1,2,3,4-tetravinyl cyclotetrasiloxane, another is 1-ethynyl-1-cyclohexanol. The ethynylcyclohexanol inhibitor is added to Part B in the range of approximately 0.01 to 0.2 parts per hundred parts of Part B, by weight. Therefore it is present in the mixed aliquots to be cured or vulcanized in the range of 0.005 to 0.1 part per hundred, per weight. This inhibitor, being volatile, can be driven off by heat in a final curing step, thus allowing the cross-linking reaction to occur rapidly. Other less-volatile or non-volatile inhibitors may be used instead, the amount of these would be adjusted such that the cross-linking reaction should nevertheless occur in the desired time frame after Part A and Part B are mixed.

Addition of catalyst, cross-linker and inhibitor in the above-noted ranges usually serves to provide approximately 6–8 hours of work time at room temperature. This means that the material does not cure significantly at room temperature within 6–8 hours. Before curing and cross-linking the two aliquots are intimately mixed preferably in equal amounts.

The process of manufacturing the cured reinforced polysiloxane objects, which can serve as insulators for leads of cardiac pacemakers or other devices, starting with the preparation of the preferred embodiment of the polysiloxane copolymer, thus proceeds as follows.

In a suitable reactor octamethylcyclotetrasiloxane (precursor to the —$R_1R_2SiO$— groups of the copolymer) and tetravinyltetramethylcyclotetrasiloxane (precursor to the —$R_3R_4SiO$— groups of the copolymer) are mixed and heated until a temperature of 150° C. is reached, and the mixture is stirred at that temperature for approximately 1 hour. Then the end blocker (precursor to the $R_5R_6R_7SiO$— units of the copolymer) is added together with a catalyst. The end blocking reagent or material can be tetramethyidivinyidisiloxane, and the catalyst can be acid or base catalyst normally utilized in the art for siloxane polymerization reactions, as is described for example in U.S. Pat. No. 3,779,987 incorporated herein by reference. Preferably, however the end blocking reagent is a product which results from the reaction (equilibration) of tetramethyldivinyldisiloxane with octamethylcylcotetrasiloxane units. The catalyst is preferably potassium siloxanolate which per se is known in the art. After the end blocking reagent and the catalyst are added, heating is continued only for a short time, whereafter the catalyst is neutralized. In case of potassium siloxanolate the catalyst is neutralized by introducing carbon dioxide into the mixture. Although as it was noted above the degree of polymerization per se is hard or impossible to measure, plasticity is related to D.P. and can be measured in the routine test known as ASTM 926 "Rubber Property-Plastics and Recovery (parallel plate method). The polymerization reaction can thus be monitored by this test. At the end of the polymerization (corresponding to a desired theoretical D.P. of approximately 5000) the plasticity should be approximately 55, with a range of 50 to 60 being acceptable. The just described polymerization reaction provides the polysiloxane copolymer component of the elastomer of the present invention.

The polymer is subjected to vacuum to remove volatile materials, and is thereafter mixed with the requisite amount of silica. As it was noted above, in the process preferred for making the elastomer of the present invention, the silica is silylated substantially in the same process where it is blended with the polysiloxane copolymer. Thus, in the preferred process silica having a surface area of at least 200 $m^2$/gram is slowly blended under an inert gas blanket into the polysiloxane copolymer obtained above, together with water and the silyliating agent hexamethyldisilazine

[(CH$_3$)$_3$Si—N(H)—Si(CH$_3$)$_3$]. The mixture is heated first under the blanket of inert gas, and thereafter in vacuum to remove volatile materials. The resulting silica reinforced polysiloxane copolymer composition is sometimes referred to as the "base". It is this composition or base which is divided into the aliquots called Part A and Part B. The catalyst, cross-linking agent and inhibitor are added to Part A and Part B, respectively by intimate mixing, for example on a two roll mill, followed by passing the mixture through fine stainless steel mesh screens. Typical mesh size is generally in the range of 200 to 500, preferably approximately 400 mesh.

Fabrication of objects from the two aliquots is accomplished by intimately mixing equal or substantially equal volumes and weights of the aliquots and then shaping the mixture into the desired form, before the cross-linking or curing reaction is substantially completed. The cross-linking reaction can be accelerated by placing the shaped object into a hot air vulcanizing chamber where a volatile inhibitor is driven off, thereby allowing the cross-linking reaction to occur rapidly.

Figure 2:
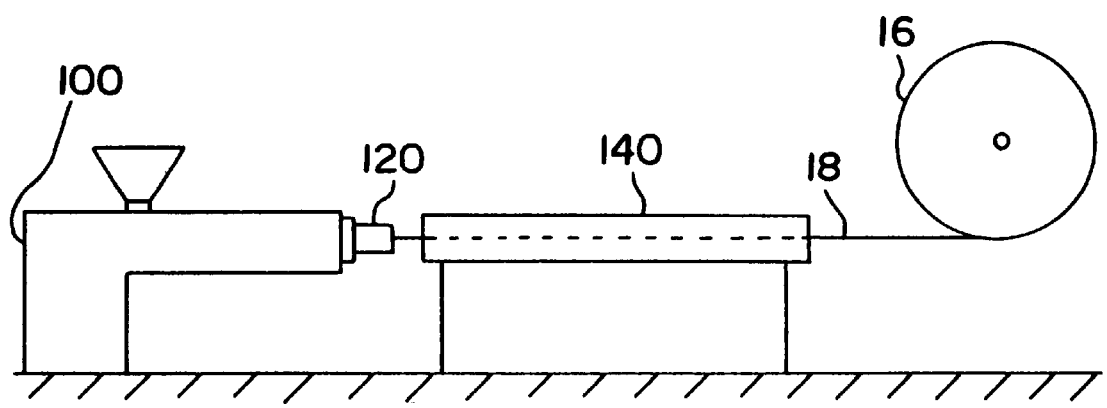
FIG. 2 is a schematic showing of an extrusion line for manufacturing thin walled medical tubing of silicone elastomer.

Generally speaking, Parts A and B are mixed on a two roll mill which provides the blended base where the curing is inhibited due to presence of the inhibitor. The blended base is then extruded through standard extrusion techniques which are per se known in the art, and are illustrated in the FIG. 2. Thus the mixed aliquots (blended Parts A and B) are placed into the extruder device 100. A typical tubing line also includes a die 120, a curing or vulcanizing oven 140, and a puller winder device 160 on which the extruded tubing is taken up or coiled. The die 120 preferably includes an internal mandrel (not shown) as is well known in the art. To obtain precise dimensions such as may be necessary with small thin-wall medical tubing, a gear pump (not shown) may be used at the extruder discharge for stable throughput. Gear pumps are calibrated to forward precise metered amounts of polymer. Their use in this manner is well known. After the tubing is formed by extrusion it is placed into a hot air vulcanizing chamber where the volatile inhibitor (ethynylcyclohexanol) is driven off, thereby allowing the cross-linking reaction to proceed to yield the final product. The preferred method for mixing Parts A and B, before shaping the mixture into insulators for leads of implantable medical devices by extrusion is described in more detail below as a specific example.

A creep evaluation test was performed on the preferred embodiment of the cured elastomer composition of the present invention which has been shaped into the form of tubing, in accordance with ASTM D 2990 Standard Test Methods for Tensile, Compression, and Flexural Creep and Creep Rupture of Plastics. For comparison the same tests were also performed on the prior art materials discussed in the introductory section of this application, namely on MDX4-4516 and on the HP material. The percentage of initial elongation upon loading was the highest for the prior art MDX4-4516 material (approximately 225%) less for the HP material (approximately 150%), and still less for the preferred embodiment (approximately 110%). Percent elongation upon loading changed in time the most (the slope of the elongation versus time curve was the largest) with the HP material, less with the MDX4-4516 material, and the least with the preferred embodiment of the present invention.

Crush resistance testing was performed by dynamically compressing the silicone tubing under a defined consistent per cent compression relative to the cross-sectional width of the tubing. The cycles of the compression were measured and recorded until the tubing split. All tubings in these tests had the same inner and outer diameters and wall thickness. In these tests the prior art HP material split after approximately 500 cycles (least crush resistant), and the prior art MDX4-4516 material split after 1500 cycles. The preferred embodiment of the invention split only after 2800 cycles, which represent a 460% increase over the HP material, and still a significant 86.6% increase over the MDX4-4516 material.

SPECIFIC EXAMPLE

Preparation of Base Polymer

In a 150 gallon suitable mixer, mix octamethylcyclotetrasiloxane (300.0 kg) and tetramethyltetravinylcyclotetrasiloxane (0.50 kg) and heat to 150° C. with agitation under a nitrogen blanket. Hold at 150° C. for one hour. After one hour add pre-equilibrated vinyidimethyl-terminated siloxane oligomer (450.0 grams) as end-blocker and 0.001 percent (by weight) of potassium siloxanolate catalyst (about 300 grams). Continue heating and stirring until polymerization is completed. (about 3 min). After completion of the polymerization the catalyst is then neutralized or destroyed by bubbling $CO_2$ through the polymer while continuing mixing. At this time the polymer is devolatilized by pulling a full vacuum on the mixer. Continue the vacuum for one hour while continuing to bubble $CO_2$ through the polymer. After one hour, stop the vacuum, stop $CO_2$ flow, vent the mixer with $N_2$, and allow to cool.

Formulation of Base Including Silica Reinforcer

In a 50 gallon, Sigma blade mixer, mix the above polymer (90.0 kg) with hexamethyldisilizane (8.06 kg) and water (2.30 kg). Blanket the mixer with $N_2$. Add adequate fumed silica to fill the mixer. Mix until the polymer and silica has massed. Continue in this manner until the total amount of silica has been added (57.6 kg). After the final silica addition has massed, bring the base to 80° C. and hold at this temperature for 30 minutes. After 30 minutes, stop $N_2$ flow, turn on vacuum to mixer, and begin heating to 180° C. Continue mixing for three hours after temperature reaches 180° C. while maintaining full vacuum. After three hours, vent mixer with $N_2$ and allow to cool.

Preparation of Parts A and B

The base is now divided into two equal parts. One of the two parts is now softened on a two roll mill. After softening, a platinum complex catalyst is added via two roll milling such that the resulting Part A contains 10–24 ppm platinum, typically 20 ppm. Using a screw type extruder, the Part A is passed through fine stainless steel mesh screens. Mesh size is generally 200–500, typically 400 mesh. The second half of the base is similarly softened. After softening, both cross-linker and inhibitor are added via two roll milling. The siloxane cross-linker, a copolymer consisting of both dimethyl and methylhydrogen monomers, is added at 2–4 parts per hundred (pph) by weight, and typically 3.0 pph. Similarly the inhibitor, generally an acetylinic alcohol such as 1-ethynyl-1-cyclohexanol, is added at amounts up to 0.12 pph, typically at 0.08 pph. The resulting Part B is now screened in a similar manner as Part A.

Combination of Parts A and B

Parts A and B may then be combined and subjected to forming as already described above.

The Examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which are also intended to be within the scope of the invention. Therefore, the scope of the present invention should be interpreted solely from the following claims, as such claims are read in light of the disclosure.

What is claimed is:

1. An electrical lead comprising a conductor and an exterior insulator covering at least a portion of the conductor, the insulator consisting essentially of a cured elastomer composition obtained by cross-linking an uncured blend composition that comprises an intimately admixed mixture that comprises the following components:

(A) silica that had been silyliated by treatment and contains trialkylsilyl groups comprising approximately 23 to 45 percent by weight of the mixture;

(B) a polysiloxane copolymer composed of divalent —$R_1R_2SiO$—, divalent —$R_3R_4SiO$— and end-blocking $R_5R_6R_7SiO$— units, comprising approximately 55 to 77 percent by weight of the mixture, where $R_1$ and $R_2$ independently are lower alkyl of 1 to 6 carbons, phenyl or trifluoropropyl, $R_3$ is vinyl, allyl, or other olefinic group having up to 4 carbons, $R_4$ is lower alkyl of 1 to 6 carbons, phenyl or trifluoropropyl, and $R_5$, $R_6$, and $R_7$ independently are lower alkyl of 1 to 6 carbons, phenyl, vinyl, allyl, or other olefinic group having up to 4 carbons and one double bond, the polysiloxane copolymer has a degree of polymerization (D.P.) approximately in the range of 3500 to 6500, and the olefin containing —$R_3R_4SiO$— groups are present randomly distributed in the polysiloxane copolymer and approximately in the 0.05 to 0.3 mol percent range, with the provisos that when $R_1$, or $R_2$, or both represent phenyl groups then proportion of the phenyl-containing divalent siloxane units does not exceed 15 mol percent and when $R_1$ or $R_2$ or both represent trifluoropropyl groups, then the proportion of the trifluoropropyl-containing divalent siloxane units does not exceed approximately 40 mol percent in the polysiloxane copolymer;

(C) a catalyst, and (D) an organohydrogen polysiloxane cross-linker, the catalyst and the cross-linker being present in the uncured blend composition in sufficient amount to cause the cross-linking reaction to occur.

2. The electrical lead of claim 1 wherein in the polysiloxane copolymer the —$R_1R_2SiO$— group is —$(CH_3)_2SiO$—, the —$R_3R_4SiO$— group is —$CH_3(CH_2=CH)SiO$—, and the $R_5R_6R_7SiO$— group is —$(CH_3)_2(CH_2=CH)SiO$—.

3. The electrical lead of claim 2 where the —$CH_3(CH_2=CH)SiO$— group is present in the proportion of 0.142 mol percent in the polysiloxane copolymer.

4. The electrical lead of claim 3 where the silyliated silica includes trimethylsilyl groups in such quantity that the carbon content of the silyliated silica is in the range of approximately 4 to 8 percent by weight of the silyliated silica.

5. The electrical lead of claim 4 where the carbon content of the silyliated silica is approximately 7.3 percent by weight of the silyliated silica.

6. The electrical lead of claim 5 where the insulator is a tube separately formed into which the conductor is inserted.

* * * * *